United States Patent Office 3,748,275
Patented July 24, 1973

---

3,748,275
PROCESS FOR PRODUCING EMULSIONS OF ORGANOPOLYSILOXANES
Willy Bernheim, Diedorf, near Augsburg, and Hans Deiner, Neusass, near Augsburg, Germany, assignors to Chemische Fabrik Pfersee GmbH, Augsburg, Germany
No Drawing. Filed June 10, 1971, Ser. No. 151,939
Claims priority, application Germany, June 30, 1970, P 20 32 381.3
Int. Cl. B01j 13/00
U.S. Cl. 252—312    9 Claims

ABSTRACT OF THE DISCLOSURE

A process for producing emulsions of organopolysiloxanes which contain hydrogen atoms bound to silicon and which are suitable for hydrophobing fibrous materials of all types, whereby polyoxyethylene compounds are used as emulsifiers, is characterized by the use as emulsifiers of polyoxyethylene alklamines of the general formula

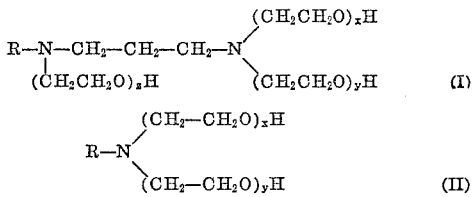

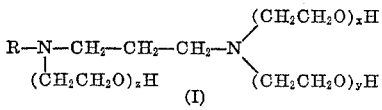

wherein R is an aliphatic saturated or unsaturated alkyl residue with at least 12 C-atoms, x, y and z are the same or different numbers greater than 1, and having an HLB number of 9 to 18, or their salts with low molecular organic acids or mineral acids.

---

This invention relates to a process for producing emulsions of organopolysiloxanes which contain hydrogen atoms bound to silicon.

It is known in the art to produce aqueous emulsions of organopolysiloxanes by the use of ethylene oxide reaction products of alkyl phenols, fatty acids, fatty alcohols and fatty acid amides as emulsifiers. When these emulsions are used for water repulsion, for example for making fibrous materials, particularly textiles, water repellent, they have the drawback that hydrophobing effects are substantially impaired by these emulsifiers.

It has also been suggested to use polyvinyl alcohols as emulsifiers for organopolysiloxanes. These emulsions are, however, insufficiently frostproof and, above all, the stability of the impregnating baths produced therewith shows substantial drawbacks. The lack of stability of the concentrated emulsions and of the impregnation baths produced therefrom is caused above all by the fact that a substantial splitting off of hydrogen takes place in the concentrated as well as in the diluted emulsion.

An object of the present invention is the provision of a process for producing emulsions of organopolysiloxanes which contain hydrogen atoms bound to silicon, and which are suitable for hydrophobing fibrous materials of all types, whereby this process does not have the above-indicated drawbacks of prior art processes.

Other objects of the present invention will become apparent in the course of the following specification.

In the accomplishment of the objectives of the present invention it was found desirable to use as emulsifiers ethoxylated alkylamines of the general formula

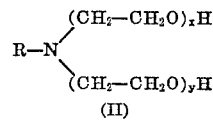

wherein R is an aliphatic saturated or unsaturated alkyl residue with at least 12 C-atoms, x, y and z are the same or different numbers greater than 1, and having an HLB number of 9 to 18, or their salts with low molecular organic acids or mineral acids.

Emulsifiers used in accordance with the present invention for the manufacture of emulsions have the general above-indicated Formulas I and II wherein R is an aliphatic saturated or unsaturated alkyl residue with at least 12 C-atoms, particularly 16 to 20 C-atoms and x, y and z are the same or different numbers greater than 1, and having an HLB number of 9 to 18, particularly 11.5 to 16.0. According to Griffin (J. Soc. Cosm. Chem. 1949, 311) this HLB number gives information about the hydrophilic-lipophilic balance of an emulsifier. Thus the compounds of the Formulas I and II are tertiary amines having a cationic character which, however, with an increase in the ethylene oxide content act more and more as non-ionic compounds. In addition to free amines ammonium salts of these compounds can be used, which are produced in the reaction of these amines with low molecular organic salts, such as acetic acid, formic acid or propionic acid and mineral acids, such as muriatic acid, hydrobromic acid, sulphuric acid or phosphoric acid. Preferred for use are polyoxyethylene alkylaminehydrochlorides and/or acetates. As examples of emulsifiers the following can be stated: ethoxylized cocoa fat amine with 5, 10 or 15 ethylene oxide, ethoxylized stearyl amine or oleyl amine with 5, 10 or 50 ethylene oxide, ethoxylized hexadecyl amine with 15 ethylene oxide, ethoxylized dodecyl decylamine and hexadecylamine with 6 ethylene oxide or ethoxylized (N-stearyl) or (N-hexadecyl) trimethylene diamine with 10 ethylene oxide. Salts of these compounds with the above-mentioned acids are also very well suitable.

Emulsifiers employed in the process of the present invention are used with reference to emulsified organopolysiloxane in amounts of about 2 to 20 parts by weight, particularly 6–15 parts by weight.

Organopolysiloxane emulsions produced in accordance with the process of the present invention contain organopolysiloxanes with hydrogen atoms bound to silicon, as, for example, alkyl hydrogenpolysiloxanes, particularly methyl or ethyl hydrogenpolysiloxanes. Possibly they can be mixed with organopolysiloxanes which do not contain any hydrogen atoms bound to silicon, particularly dimethylpolysiloxanes or diethylpolysiloxanes. Obviously it is also possible to use instead of these mixtures suitable cohydrolysates of silanes, namely to hydrolyse jointly for the manufacture of organopolysiloxanes silanes which contain hydrogen atoms bound to silicon with such silanes which do not contain hydrogen atoms bound to silicon and to emulsify the cohydrolysates thus produced. Then in general the molar part of alkylhydrogenpolysiloxanes should predominate.

The use of the above-mentioned organopolysiloxanes for the hydrophobing of fibrous materials, such as textiles, paper and leather is already known. See, for example, the book of Walter Noll in the German language entitled "Chemie und Technologie der Silicone," 1960, chapters 10.8, 10.9 and 10.10.

The usual manufacture of emulsions consists in that organopolysiloxane is dissolved in an indifferent, water-insoluble, organic solvent, such as hydrocarbons, chlorinated hydrocarbons or their mixtures and then it is stirred into a solution of the emulsifier in water. Then the pre-emulsions thus produced can be additionally posthomogenized in known devices. The pH value of the emulsion is set either prior to homogenizing with a corresponding amount of mineral acid, which is preferably added to the diluting water, or it is corrected after the homogenizing of the emulsions, whereby a pH value is set of 1.3 to 3.3, particularly 2.0 to 2.5. Emulsions produced in accordance with the process of the present invention should contain at least 20% of organopolysiloxanes. However emulsions can be also easily produced with a content of up to 50% organopolysiloxane.

A particular embodiment of the process of the present invention consists in that during the emulsification of the polysiloxane aliphatic saturated alcohols are also used. When this procedure is used, high pressure homogenizing can be eliminated and it is sufficient to use rapid stirrers to produce stable silicon emulsions. Then the polysiloxane is dissolved in water-insoluble solvents in the presence of an aliphatic saturated alcohol with 4 to 10 carbon atoms and the emulsifier being used is dissolved in this mixture. Then water is added slowly with forceful stirring and after a short time a thick point is reached. The initially present water-in-oil emulsion is then changed into an oil-in-water emulsion. The adding of the remaining part of water can then take place quickly. Here also it is important for the preservation stability of the product to set the pH value with acid, specifically muriatic acid, to preferably 2.0 to 2.5. The setting of the pH value can take place here as in the case of high pressure emulsifying with concentrated muriatic acid, after the emulsion is completed. It is better, however, to add the acid in advance to the available water and to emulsify with this acid water, as described. As alcohols can be used, for example, n-butanol, n-octanol, hexanol-(3) or pentanol-(2). Branched alcohols, such as 2-ethyl-hexanol-(1) or 2-methyl-hexanol-(2) can be also used. The added alcohol is necessary to make possible a homogenous dissolving of the emulsifier in the siloxane-solvent mixture. In general already 10% alcohol related to the organopolysiloxane to be emulsified, is sufficient to provide a safe operation. The upper limit is not critical here, but results solely from economic considerations. It amounts in the average to 60%. Preferably 20 to 45% of the above-mentioned alcohols are added, related to the organopolysiloxane to be emulsified.

Siloxane emulsions produced by the use of a quick stirrer can be finally stabilized by the addition of urea or a urea derivative. This addition is stirred in after completed emulsification and is quickly dissolved in the emulsion. In addition to urea, urea derivatives, such as thiourea, ethylene urea, propylene urea and dihydroxyethylene urea are suitable. In order to obtain adequate stabilization an addition of 8% is sufficient, related to the emulsified organopolysiloxane. The upper limit of the amount of the added urea or urea derivative is determined by the solubility of these products in the emulsion. The upper limit is about 50%. Usually 20 to 40% of the stated additional products related to the emulsified organopolysiloxane, are added to the finished emulsions.

The advantage of the organopolysiloxane emulsions produced in accordance with the process of the present invention consist above all in small hydrogen splitting off and thus in a high stability of the concentrated emulsion as well as the treating baths produced therewith. Thus the concentrated emulsions are fully resistant against freezing and the shaking resistance of the treating baths is excellent. As compared to known polyvinyl alcohol polysiloxane emulsions, the silicon emulsions of the present invention have furthermore the advantage that they can be easily used along with dihydroxyethylene urea resins and have an excellent water repellent quality also when applied upon velvet. A further completely surprising advantage of the process of the present invention consists in that the impregnation effects are not affected by the emulsifiers when treating fibrous materials of all different types. This advantage is particularly surprising since ethoxylated products of fatty acid amides, which are very similar compounds, have such a bad effect upon impregnation that these emulsifiers for the production of polysiloxane emulsions have found little use in actual practice for the impregnation of textiles. Finally a particular advantage of the process of the present invention consists in that when aliphatic saturated alcohols are used, the otherwise usual high pressure homogenation can be eliminated. This advantage means the saving of a very expensive operational step and is of great importance particularly due to the high costs of these machines.

Emulsions prepared in accordance with the present invention after corresponding dilution and after addition of hardening catalysts known for the hardening of organopolysiloxanes, are suitable for the hydrophobing of fibrous materials of all types. However, they can be also combined with other agents known in the treatment of fibrous materials so as to improve their properties, for example, crease resistant agents.

The following examples are given by way of exemplification only:

EXAMPLE 1

(A) 25 gr. of the following emulsifier are dissolved in 325 ml. of water

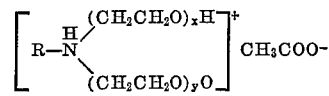

($R = 16$ C-atoms on the average; $x+y=10$)

After the addition of about 2 ml. concentrated muriatic acid, a mixture consisting of 240 gr. methyl hydrogenpolysiloxane (specific weight 0.99 to 1.01, viscosity 20 to 30 cp., 96 to 98% $SiO_2$), 60 gr. dimethyl polysiloxane (specific weight 0.97, viscosity at 25° C. 750 cst.), 12 gr. perchlorethylene, 38 gr. toluol is turbined in a thin jet. Then the emulsion is homogenized at 20° C. and 250 at. over p. in a high pressure homogenizing machine. After termination of homogenization 200 ml. water are also added and the pH value is set to 2.2 with muriatic acid.

(B) In the same manner another organopolysiloxane emulsion was prepared according to prior art, whereby instead of the emulsifier stated under (A) were used 25 gr. of a polyvinyl alcohol having an average polymerization degree of 2000, a molecular weight averaging 100,000 and having in a 4% aqueous solution at 20° C. a viscosity of 48 cp.

(C) In the manner described under (A) and according to prior art a further organopolysiloxane emulsion was prepared; however, instead of the emulsifier stated there was used the same amount of an emulsifier having the following formula:

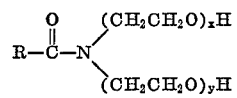

(R is an alkyl residue with an average of 16 carbon atoms and $x$ and $y$ equal 10)

If hydrogen splitting off is measured in 250 gr. of emulsions A to C while storing at about 25° C., then after measuring for 96 hours the following average value for splitting off is produced in ml. hydrogen per hour:

| Emulsion— | Hydrogen splitting off |
| --- | --- |
| A present invention | 0.65 |
| B prior art | 1.05 |
| C prior art | 0.7 |

An examination as to resistance to freezing produced the following, whereby the concentrated emulsions were frozen at −15° C. and then thawed:

Emulsion—
  A, present invention _____ Freeze resistant.
  B, prior art _____ Not freeze resistant.
  C, prior art _____ Do.

A cotton poplin (about 170 gr./m.²) was foularded with a bath having 60 gr./l. of the produced emulsions, (a) 25 gr./l. of the catalyst produced as described hereinafter and (b) 20 gr./l. of a 20% catalyst solution containing per gr. atom zirconium 1 mol versatic acid and 1 mol lauric acid; then it was pressed to about 80% bath reception, dried for 10 minutes at 120° C. and condensed for 5 minutes at 150° C. A procedure according to Bundesmann produces the following water receiving and water repellent effects:

|  | Emulsion A present invention | | Emulsion B prior art | | Emulsion C prior art | | |
|---|---|---|---|---|---|---|---|
|  | Catalyst a | Catalyst b | Catalyst a | Catalyst b | Catalyst a | Catalyst b | Untreated |
| Water reception according to Bundesmann, in percent | 14 | 16 | 19 | 16 | 27 | 23 | 80 |
| Water repellent effect | 4 | 4 | 4 | 4 | 2 | 3 | 1 |
|  | 3 | 3 | 2 | 3 | 1 | 1 |  |
|  | 2 | 2 | 1 | 2 |  |  |  |

The catalyst (a) was produced as follows:

35 gr. 4,4′ - dihydroxide diphenyl propane diglycide ether, 4 gr. cyanamide, 15 gr. triethanol amine and 12 gr. isobutanol are heated with return flow while stirring for 35 minutes. Then the reaction is stopped by the addition of a mixture of 18 gr. 60% acetic acid and 450 gr. water and a clear to opalescent solution is produced having a pH of 4.7, which can be diluted with water in any ratio.

If the same procedure is carried out with the same fabric but there are added additionally 60 gr./l. of a 50% aqueous solution of a usual textile resin (mixture of dimethylol ethylene urea and hexamethylol melamine etherified with methanol in the ratio 2:1) and 6 ml./l. of an aqueous 50% zinc nitrate solution having a pH equal to 1.0, the following values are produced after treatment according to Bundesmann:

|  | Emulsion A present invention | | Emulsion B prior art | | Emulsion C prior art | | |
|---|---|---|---|---|---|---|---|
|  | Catalyst a | Catalyst b | Catalyst a | Catalyst b | Catalyst a | Catalyst b | Untreated |
| Water reception according to Bundesmann in, percent | 10 | 9 | 11 | 12 | 24 | 14 | 80 |
| Water repellent effect | 4 | 4 | 4 | 4 | 3 | 4 | 1 |
|  | 4 | 4 | 4 | 4 | 2 | 2 |  |
|  | 4 | 4 | 3 | 3 | 1 | 1 |  |

EXAMPLE 2

Into a solution of 300 gr. hydrogenmethyl polysiloxane (as per Example 1) in a mixture of 46 gr. perchlorethylene and 154 gr. toluol are added 100 gr. n-octanol, and 25 gr. of the emulsifier described in Example 1 are homogenously dissolved in the product thus obtained. In the mixture thus produced are initially slowly turbined 275 ml. water by means of a quick stirrer. After about one half of the water has been added the emulsion is changed into an oil-in-water emulsion, whereupon the rest of the water can be added more quickly. A fine-particled stable emulsion is produced which can be further stabilized by the addition of 100 gr. urea in solid form. The emulsion which is thus produced is extremely suitable for the hydrophobing of textiles of all types and has properties which are as good as those of the emulsion of the present invention produced in accordance with Example 1.

If this emulsion (60 gr./l. with catalyst b in Example 1) is used to treat velvet clothing in the usual manner, with a water reception of only 10% an excellent water repellent effect is produced. In comparison, an emulsion produced correspondingly with polyvinylalcohol has a water reception of 80% and no water repellent effect.

An emulsion which is just as good and useful is produced when only 15 gr. of the emulsifier, 50 gr. of alcohol and 150 gr. of the solvent mixture are used and no urea is added to the finished emulsion.

EXAMPLE 3

In 300 gr. water are dissolved 40 gr. of the following emulsifier:

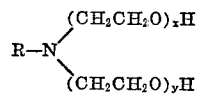

$(x+y)=10$ and R is an aliphatic saturated residue with an average of 17 C-atoms).

Into this solution is slowly turbined in a thin jet a mixture of 400 gr. of a mixture of methyl hydrogen polysiloxane and dimethyl polysiloxane (mixture ratio 4:1, viscosity at 20° C. 150 c.), 40 gr. toluol and 15 gr. dichlorethylene. The comparatively roughly dispersed emulsion was thereupon homogenized for about 50 minutes at 250 to 270 at. over p. and 20° C. in a high pressure homogenizing machine. Finally by the addition of muriatic acid the pH value of the obtained finely dispersed emulsion was set to 2.5. The emulsion which is thus produced has a hydrogen splitting off of only 0.5 ml./hr., is resistant against freezing and the treating baths produced with it are exceptionally stable against mechanical strains.

EXAMPLE 4

250 gr. of a pure methyl hydrogen polysiloxane (viscosity 40 cp. at 20° C.) were dissolved in 200 gr. of a mixture of toluol and trichlorethylene (volume ratio 6:1) and then 150 gr. of n-hexanol were added. In this solution was homogenously dissolved an ethoxylated stearylamine with 5, 10 resp. 50 ethylene oxide (always 30 gr.). Then were added 400 ml. water with a pH 1.8 (set with muriatic acid) under strong stirring, whetreby after addition of about 200 ml. the thick point is reached and the remaining water can be then added quickly. Exceptionally permanent emulsifiers are produced with all three emulsifiers which are resistant against freezing and with the usual catalysts produce good water repellency on cotton and cotton mixtures. Treating baths produced with this emulsion are resistant against shaking.

EXAMPLE 5

20 gr. of an ethoxylated (N-stearyl) trimethylene diamine with 10 ethylene oxide are provided dissolved in 300 gr. water, 1.5 ml. concentrated muriatic acid are added and a mixture consisting of 300 gr. of a methyl hydrogen polysiloxane (ratio of hydrogen atoms to methyl groups bound to silicon is 1:4, viscosity at 20° C. is 240 cp.) and 60 gr. chlorbenzol is turbined in a thin jet. The pre-emulsion thus produced was homogenized at room temperature, the pH value was set with muriatic acid at 2.8 and it was filled with water to 1000 gr. The finely dispersed emulsion thus produced has under conditions described in Example 1 a hydrogen splitting off of 0.7 ml. per hour, it is resistant against freezing and has along with artificial resin and the usual hardening catalysts an excellent water repulsion and water repellent effects upon textile materials.

EXAMPLE 6

50 gr. of chloride of cocofat amine with 15 ethylene oxide were dissolved in 400 gr. water, 1 ml. concentrated muriatic acid was added and into this solution was slowly turbined a mixture of 250 gr. of a mixed polymerisate of hydrogen siloxane and ethylsiloxane in 100 gr. trichloroethylene. The pre-emulsion thus obtained was homogenized in a high pressure homogenizing machine at 250 at. over p. and room temperature. Thereupon the pH value was set at 1.7 with muriatic acid and it was filled with water to 1000 gr. The emulsion thus obtained has all the excellent properties described in the previous example.

EXAMPLE 7

350 gr. of a polymer hydrogen methyl polysiloxane (viscosity 50 cp. at 20° C.) were dissolved in 200 gr. perchlorethylene and 80 gr. n-butanol were stirred in. In this solution were homogeneously dissolved 60 gr. of an ethoxylated (N-hexadecyl) trimethylene diamine with 20 ethylene oxide. Then water was slowly added while stirring and after a short time the thick point was reached, whereby the initially present water-in-oil emulsion was changed into an oil-in-water emulsion. Then with strong stirring water was added until 1000 gr. were reached and finally 40 gr. ethylene urea were stirred in. The emulsion thus produced was set with concentrated muriatic acid to a pH value of 2.0 and has all the advantageous properties described in Example 4.

It is apparent that the above examples were given by way of illustration only and that the scope of the present invention is determined by the appended claims.

We claim:

1. A process for producing aqueous emulsions of organopolysiloxanes containing hydrogen atoms bound to silicon, comprising the steps of dissolving the organopolysiloxanes in an indifferent water-insoluble organic solvent, water and emulsifier while vigorously mixing, said emulsifier belonging to the group consisting of polyoxyethylene alkylamines of the general formula

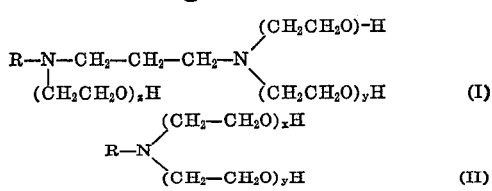

wherein R is an aliphatic saturated or unsaturated alkyl residue with at least 12 C-atoms, $x$, $y$ and $z$ are the same or different numbers greater than 1, and having an HLB number of 11.5 to 16.0, and setting the pH value at 1.3 to 3.3, particularly 2.0 to 2.5.

2. A process in accordance with claim 1, comprising adding said organopolysiloxane solution with stirring to an aqueous solution of said emulsifiers, whereby a pre-emulsion is obtained, and homogenizing said pre-emulsion.

3. A process in accordance with claim 1, wherein the emulsifying takes place in the presence of 10% to 60%, particularly 20% to 45% of an aliphatic saturated alcohol with 4 to 10 C-atoms, related to organopolysiloxanes.

4. A process in accordance with claim 3 comprising adding slowly water with forceful stirring to a solution containing said organopolysiloxanes, said water-insoluble organic solvents, said alcohols and said emulsifiers until thickening in the course of which the obtained water-in-oil emulsion is changed spontaneously in an oil-in-water emulsion and then adding the remaining water.

5. A process in accordance with claim 3, comprising adding to the finished emulsions a compound selected from the group consisting of urea, thio urea, ethylene urea, proplyene urea and dihydroxyethylene urea.

6. A process in accordance with claim 3, wherein from 8% to 50% of urea or said urea derivatives, particularly 20% to 40% related to organopolysiloxanes, is used.

7. A process in accordance with claim 1, wherein emulsifiers are used wherein R is an aliphatic saturated residue with 16 to 20 C-atoms and the HLB number is 11.5 to 16.0.

8. A process in accordance with claim 1, wherein as emulsifiers are used polyoxyethylene alkylamine hydrochlorides or polyoxyethylene alkylamine acetates.

9. A process in accordance with claim 1, wherein from 2% to 20% of emulsifier, particularly 6% to 15%, related to organopolysiloxane, is used.

References Cited

UNITED STATES PATENTS 2,755,194    7/1956    Volkmann et al. _____ 252—312

JOHN D. WELSH, Primary Examiner

U.S. Cl. X.R.

252—8.6, 49.5